US009749498B2

(12) United States Patent
Austin et al.

(10) Patent No.: US 9,749,498 B2
(45) Date of Patent: Aug. 29, 2017

(54) COMPUTER DEVICE AND METHOD FOR CONTROLLING ACCESS TO A PRINTER

(71) Applicant: Avecto Limited, Manchester (GB)

(72) Inventors: Mark James Austin, Manchester (GB); John Goodridge, Cheshire (GB)

(73) Assignee: AVECTO LIMITED, Manchester (GB)

( * ) Notice: Subject to any disclaimer, the term of this patent is extended or adjusted under 35 U.S.C. 154(b) by 0 days.

(21) Appl. No.: 15/213,904

(22) Filed: Jul. 19, 2016

(65) Prior Publication Data

US 2017/0026550 A1 Jan. 26, 2017

(30) Foreign Application Priority Data

Jul. 20, 2015 (GB) .................................. 1512677.4

(51) Int. Cl.
*H04N 1/44* (2006.01)
*G06F 3/00* (2006.01)

(52) U.S. Cl.
CPC ............ *H04N 1/4413* (2013.01); *G06F 3/00* (2013.01)

(58) Field of Classification Search
None
See application file for complete search history.

(56) References Cited

U.S. PATENT DOCUMENTS

2005/0149726 A1* 7/2005 Joshi ...................... G06F 21/51 713/164
2011/0235085 A1* 9/2011 Jazayeri ............... G06F 3/1204 358/1.14
2015/0146231 A1* 5/2015 Austin ................. G06F 3/1222 358/1.14

* cited by examiner

*Primary Examiner* — Andrew H Lam
(74) *Attorney, Agent, or Firm* — Knobbe, Martens, Olson & Bear LLP

(57) ABSTRACT

Content files are isolated in a sandbox as a content isolation environment formed by a secondary user account. Printing is controlled by an agent via a staging file of a secure file type. The agent intercepts print requests (e.g. print start requests and print end requests) in a printing sub-system of an operating system in order to coordinate and securely control printing of the untrusted content file via the intermediate staging file.

20 Claims, 10 Drawing Sheets

COMPUTER DEVICE AND METHOD FOR CONTROLLING ACCESS TO A PRINTER

CROSS REFERENCE TO RELATED APPLICATIONS

This application claims priority under 35 U.S.C. §119 to Application No. 1512677.4 filed Jul. 20, 2015 in United Kingdom, the entire disclosure of which is incorporated by reference herein.

BACKGROUND

Technical Field

The present invention relates generally to the field of computers and computer devices. More particularly, the present invention relates to a computer device and a method for controlling access to a printer.

Description of Related Art

Printing is an essential function in most business or corporate computing environments. Different types of printers support various different printing functions. For example, some types of printers may provide advanced printing functionality, such as colour, double-sided or selectable paper sizes. Other printers may provide, for example, for high volume printing or specialist 3-dimensional (3D) printing. Typically, a local printer may be directly coupled to the computer device of an individual user. Further, group printers or shared printers may be configured to be shared by certain groups of users. Network printers may be made available over a local network, such as via a print server. In this way, in a typical corporate or business environment, each user may be given access to a plurality of printers, which may include a mixture of local, shared, group and network printers.

Printing may appear to be apparently a relatively benign function, but allowing access to printers may provide a vector for attack in a computer network. For example, malicious code may exploit security vulnerabilities in the printing functions of a computer system. Malicious content embedded in documents may become active upon printing, thereby compromising security of the computer devices. For example, malicious shellcode, VBA macros, or JavaScript (RTM) hidden in documents may launch during printing and attack the computer devices, or open access to the computer devices from the Internet.

As is well recognised in the field of computer security, there is an on-going need to protect computer devices from malicious content. In particular, it is desired to protect the computer devices from malicious content which may be introduced or propagated by actions of a user, such as printing a document.

In the related art, it is known to isolate untrusted content by limiting resources of the computer devices which are accessible by untrusted content. A difficulty arises, however, in that these relatively secure mechanisms for content isolation typically preclude printing. In other words, protecting the computer devices from malicious content tends to then inhibit the printing function or deny access to the desired full variety of printers. Conversely, relaxing the secure mechanisms for content isolation, so as to allow printing, may expose the computer devices to malicious content. Hence, there is still a need to control access to printers whilst robustly and effectively blocking malicious content.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer system, a method and a computer-readable storage medium as set forth in the appended claims. Other, optional, features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In one example there is described a computer device coupled to a printer, the computer device comprising: a hardware layer including a processor and a memory; an operating system and an agent which are executed by the hardware layer to: provide printer services accessible from a primary user account, wherein the printer services are configured to print user files accessible from the primary user account on the printer connected to the computer device in response to print requests for the user files; create a secondary user account derived from the primary user account and which isolates a content file therein; and provision a printer service accessible from the secondary user account, wherein the printer service is isolated from the printer connected to the computer device; and intercept a print request from the secondary user account for printing of the content file; arrange the printer service to print the content file to a staging file in a staging location in response to the print request; receive a notification that the content file has been printed to the staging file; and satisfy the print request for the file from the secondary user account by printing the staging file on the printer connected to the computer device using the printer services accessible from the primary user account, in response to the notification that the file has been printed to the staging file.

In one example, the agent is further configured to examine the intercepted print request and determine an outcome selected from a group comprising (i) passing through the print request to the operating system, (ii) denying the print request, or (iii) continuing the print request via the staging file.

In one example, the staging file is stored in the staging location which is accessible from the primary user account and wherein the agent is configured to obtain the staging location of the staging file from the intercepted print request.

In one example, the agent is configured to store a filename of the staging file.

In one example, the agent may be configured to set a file type of the staging file.

In one example, the agent is configured to set the staging location of the staging file.

In one example, the staging location of the staging file is a folder in the secondary user account which is also accessible from the primary user account.

In one example, the agent may be configured to arrange printing of the staging file on the printer connected to the computer device by launching a print dialog from the primary user account in response to the notification that the file has been printed to the staging file.

In one example, the agent is configured to receive the notification that the content file has been printed to the staging file by intercepting an end print request related to the content file.

In one example, the agent is configured to delete the staging file after the print request has been satisfied.

In one example there is described a method for controlling printing of files on a computer device, the method being implemented by hardware of the computer device including at least a processor and a memory, the method comprising: providing printer services accessible from a primary user account, wherein the printer services are configured to print user files accessible from the primary user account on a printer connected to the computer device in response to print requests; creating a secondary user account derived from the primary user account and which isolates a content file therein; and provisioning a printer service accessible from the secondary user account, wherein the printer service is isolated from the printer connected to the computer device; intercepting a print request from the secondary user account to print the content file; arranging the printer service to print the content file to a staging file in response to the print request; storing the staging file in a staging location accessible from the primary user account; receiving a notification that the content file has been printed to the staging file; and satisfying the print request for the content file by arranging the staging file to be printed on the printer connected to the computer device using the printer services accessible from the primary user account, in response to the notification that the file has been printed to the staging file.

In one example, the method further comprises examining the intercepted print request and determining an outcome selected from a group comprising (i) passing through the print request to the operating system, (ii) denying the print request, or (iii) continuing the print request via the staging file.

In one example, the staging file is stored in the staging location which is accessible from the primary user account and wherein the method comprises obtaining the staging location of the staging file from the intercepted print request.

In one example, the method comprises storing a filename of the staging file.

In one example, the method comprises setting a file type of the staging file.

In one example, the method comprises setting the staging location of the staging file.

In one example, the staging location of the staging file is a folder in the secondary user account which is also accessible from the primary user account.

In one example, the step of arranging printing of the staging file on the printer connected to the computer device comprises launching a print dialog from the primary user account in response to the notification that the content file has been printed to the staging file.

In one example, the step of receiving the notification that the content file has been printed to the staging file comprises intercepting an end print request related to the content file.

In one example, the method comprises deleting the staging file after the print request has been satisfied.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

At least some of the following example embodiments provide an improved mechanism for controlling access to a printer from a computer device. The example mechanism is simple and convenient for a user, and is lightweight to implement. Further, the example embodiments are secure in practical implementations while allowing printing of isolated content. Many other advantages and improvements will be discussed in more detail herein.

Some of these example embodiments will be discussed in detail in relation to computers and computer devices using the Windows™ family of operating systems provided by Microsoft™. However, the teachings, principles and techniques of the present invention are also applicable in other practical embodiments. For example, the described embodiments are also applicable to other operating systems, such as UNIX®, Linux®, and iOS®, and in particular those having a discretionary access control security model.

Figure 1:
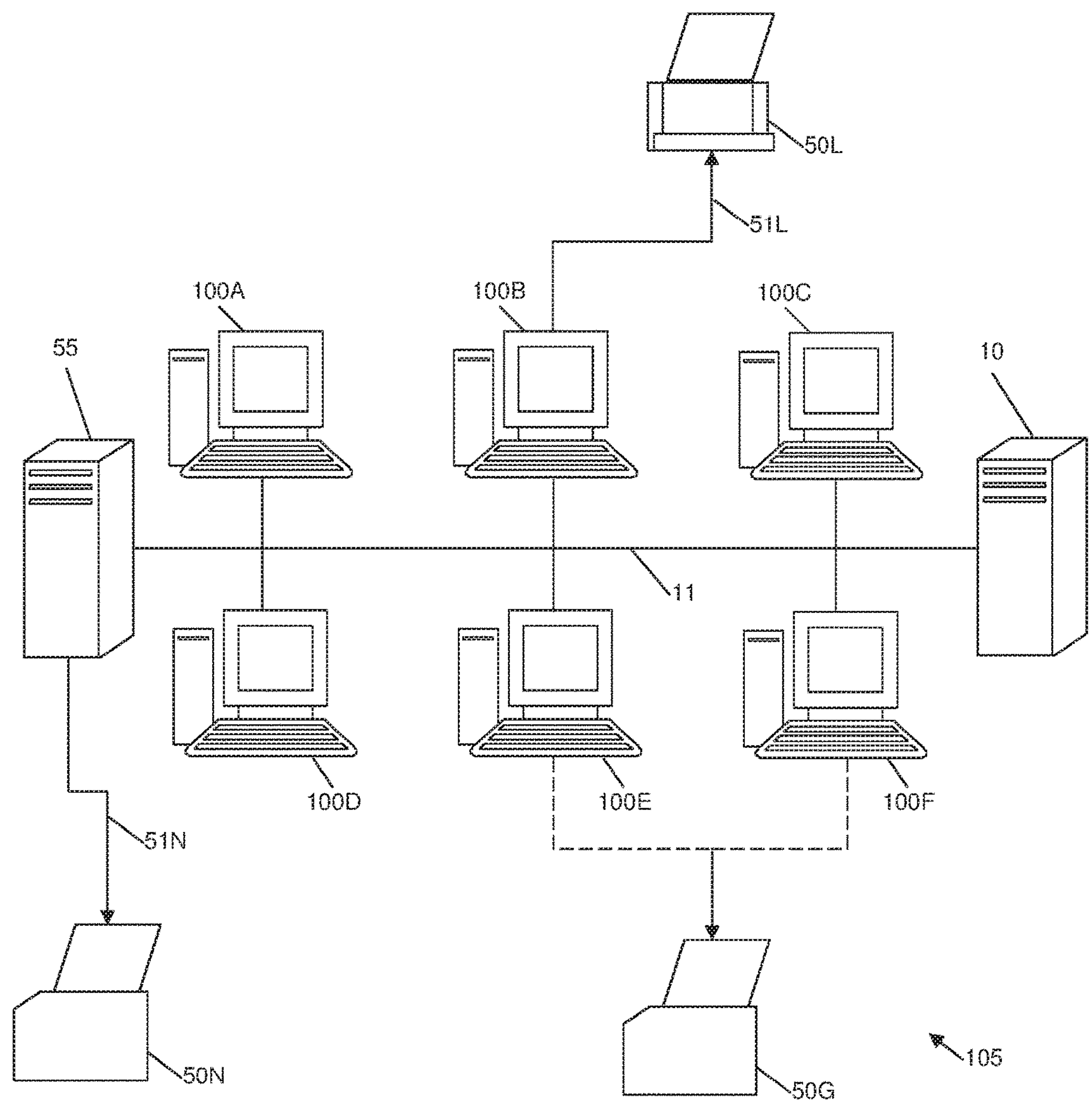
FIG. 1 is a schematic view of an example computer network.

FIG. 1 is a schematic view of an example computer network 105 for illustration of the teachings herein. A plurality of computer devices 100 (i.e. devices 100A-100F) are coupled to a communication network 11 and to one or more network servers 10. In practice such a computer network may involve tens, hundreds or even thousands of individual user computer devices, printers, and so on, as may be typically implemented in a large-scale business or corporate environment.

The computer network 105 includes a plurality of printers 50, which may include a mixture of local, shared, group and/or networked printers, as will be familiar to those skilled in the art. For example, printer 50L is a local printer which is directly coupled to one of the computer devices 100B such as by a USB cable 51L. In another example, printer 50G is a group printer which is made available to a group illustrated by the devices 100E & 100F. In another example, printer 50N is a network printer which is made available to some or all of the computer devices 100A-100F over a network path 51N which may be directed via a print server 55. The printers 50 are illustrated as physical devices (e.g. a laser printer for printing on paper). In some cases the printers 50 may include virtual print devices which are reached by the same printing system but then output a print job as a file (e.g. for printing to a file which is then stored electronically by the computer system rather than committed to paper).

A print dialog may be displayed when the user selects a command to print documents from their computer device. For example, device 100B may be configured to allow access to printers 50L and 50N and the user may choose the currently desired printer for a particular print job through the print dialog. In contrast, when printing from the computer device 1001A, only group printer 50G may be shown in the respective print dialog. Furthermore, printing from the computer devices 1001E or 100F may allow the user to select either the network printer 50N or the group printer 50G from the print dialog, for example.

While the computer system 105 provides users with printing options according to the set of connected printers 50, these printing functions, whether performed locally or across the network, may expose the computer devices 100 and/or the computer network 105 to attacks by malicious content. Hence, the example embodiments provide a more secure mechanism for controlling access to the printers 50.

Figure 2:
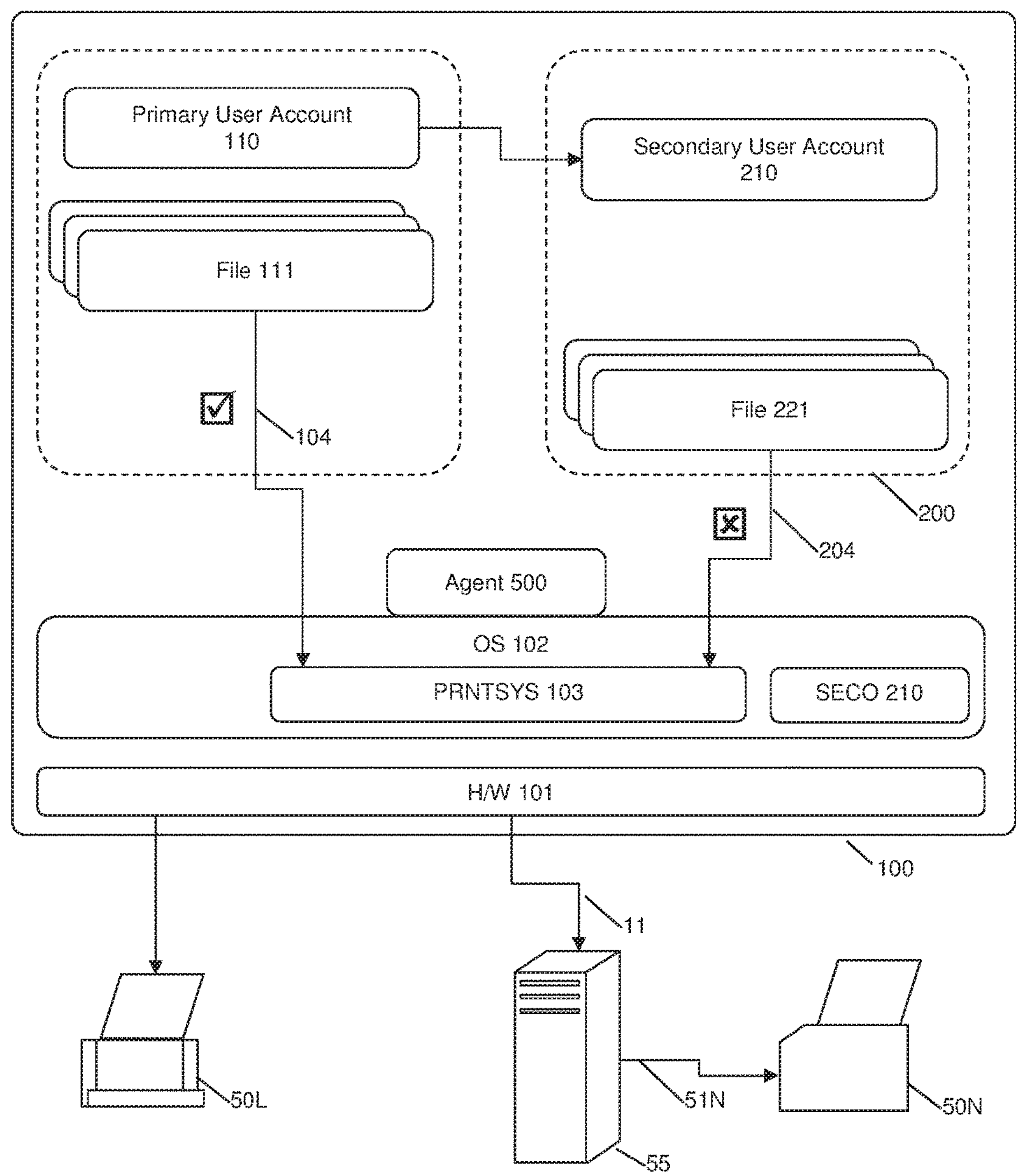
FIG. 2 is a schematic view of an example computer device in more detail.

FIG. 2 is a schematic overview of one of the computer devices 100 in more detail. In this example, the computer device 100 includes physical hardware (HW) 101, an operating system (OS) 102, a printing system (PRNTSYS) 103, and an agent 500.

Generally, the physical hardware 101 includes a memory, one or more processors (CPUs), one or more I/O interfaces (e.g. network cards, USB interfaces), a power supply and so on. The computer device 100 may take any suitable form factor, such as a server, a static desktop computer or a portable computing device (laptop, tablet, handheld, smartphone, etc.) The operating system 102 executes on the hardware 101 to provide a runtime environment which supports execution of a plurality of user processes or productivity applications, according to the needs of the user or users of this particular device. The runtime environment provides resources such as installed software, system services, drivers, files and/or registry settings.

In this example, the operating system 102 applies a security model wherein access privileges are based on a user account. The operating system 102 may define privilege levels appropriate to different classes of users, or groups of users, and then apply the privileges of the relevant class or group to the particular logged-in user (e.g. ordinary user, super-user, local administrator, system administrator and so on). The user is authenticated such as by logging in to the computer device 100 with a user identity and password, and these user credentials may be validated locally or via a remote service such as a domain controller (e.g. an Active Directory domain controller). The user, via their previously prepared security account, thus acts as a security principal in the security model. The operating system 102 of the computer device then grants appropriate privileges to processes or applications which execute in that user's security context.

The operating system 102 may include a security subsystem (SECO) 210 which is provided to enforce security within the computer device 100. As one example, the security sub-system is provided by the Windows™ operating system as supplied by Microsoft Corp of Redmond, Wash., USA, under the trade marks Windows NT, Windows 2000, Windows XP, Windows Vista, Windows Server 2003, Windows Server 2008, Windows 7, Windows 8 or later versions, amongst others. The security sub-system 210, also termed a security module or security manager, suitably enacts the Windows security model as described, for example, in "*Windows Security Overview*" published 10 Jun. 2011 by Microsoft Corporation.

As shown in FIG. 2, a sandbox 200 is provided to protect the computer device 100 from malicious attacks by isolating untrusted applications and/or untrusted content. The sandbox 200 can also be termed a 'content isolation environment' and is suitably created and controlled by an agent 500 as will be explained in more detail below.

Typically, user interactions may cause the computer device 100 to perform tasks, at least some of which may be defined in advance as being 'untrusted' tasks. For example, untrusted tasks may include certain forms of Web browsing, viewing email attachments, starting an untrusted application program, or accessing a particular file in a storage medium. Generally, the untrusted tasks may involve non-executable content (data) and/or may include executable content (code) which, at least initially, is not trusted. That is, the untrusted tasks may be in relation to untrusted content (e.g. files) or untrusted content may be accessible on the computer device 100. Hence, the agent 500 is configured to provide the sandbox 200 which is used to isolate these untrusted tasks and/or this untrusted content, so that these tasks and/or content are inhibited from interfering with other tasks or components of the computer device 100. Isolation is advantageous to inhibit interference, whether caused intentionally or unintentionally. Notably, 'untrusted' does not mean that the respective task or content is necessarily malicious. Instead, the untrusted task or content simply has the possibility of introducing undesired effects and, at least initially, it is desired to isolate the untrusted task or content away from most of the other resources or components of the computer device 100.

In this example, the sandbox 200 has been used to isolate one or more files 221. The agent 500 is arranged to provision the sandbox 200 by programmatically creating a secondary user account 210. The agent 500 may be configured to automatically create a new secondary user account 210 with rights and privileges which are derived from those of the primary user account 110 of the logged-in user. Typically, a secondary user identity and password are created programmatically and associated with the secondary user account 210. Thus, the primary user account 110 and the secondary user account 210 are related but do not share the same user credentials.

The primary user account 110 is based on the user as the security principal and an access token of the primary user account 110 is set accordingly. Meanwhile, the secondary user account 210 is derived from the primary user account 110 and will have a subset of the privileges of the primary user account 110. In this example, the security context of the secondary user account 210 is deliberately restricted to a minimal set of access rights as its privilege level.

The operating system 102 may provide one or more print Application Program Interfaces (APIs), thereby allowing applications running on the computer device 100 to print documents on those printers 50L, 50N which are accessible to the computer device 100, via the printing sub-system 103.

In one example, multiple print APIs are provided to access and/or manage the printers and print jobs. A list of the printers accessible to the computer device may be retrieved, documents may be spooled to a specific printer via a print spooler, or a currently pending print job may be aborted or cancelled. For example, a Graphics Device Interface (GDI) print API provides applications with a device-independent printing interface, allowing a print job to be started by a GDI print API function StartDoc, the print job to be finished with a GDI print API function EndDoc and the print job to be aborted with a GDI print API function AbortDoc. As another example, an open eXtensible Markup Language (XML) Paper Specification (XPS) print API provides an interface to a print spooler so that applications may send XPS format documents to a printer. As another example, a Print Document Package API provides an interface that allows applications to access and manage a print document package. In another example, a Print Spooler API provides an interface to the print spooler so that applications can manage printers and print jobs, including starting, stopping, controlling and configuring the print jobs.

Typically, printing is initiated by the user selecting an appropriate command, such as a ‘PRINT’ menu command or a certain key-binding (e.g. ‘control-P’) while in a particular application (e.g. Microsoft Word). In response, the application is configured to call an appropriate print API function to start printing of the documents by the operating system 102 on an appropriate printer.

In this example, the printing sub-system 103 is configured to provide printer services for applications running on the computer device 100, using the available set of one or more printers, here illustrated by the two printers 50L and 50N. Particularly, the printing system 103 manages printing functions and handles printer-specific requirements. Printing may be managed by a print spooler that spools or buffers print jobs in print queues for printing by the printers. Further, the printing system 103 may convert queued, buffered print jobs into a suitable data format using a printer driver. The printer driver may include a configuration component, typically with a graphical user interface such as a dialog box, to allow the user to control user-selectable options for the desired destination printer (e.g. single or double sided, monochrome or colour printing, A3 or A4 paper size, and so on). The printer driver may render the document from a source file in to an appropriate file format and the print system may then send this print job to the selected destination printer.

In this example, the computer device 100 includes at least one trusted user file 111 in the primary user account 110. By default, under the normal behaviour of most conventional operating systems, the trusted user file 111 may be printed on the local printer 50L and/or on the network printer 50N, using the printing sub-system 103 in the operating system 102 as shown by a permitted path 104. Also, the computer device 100 is configured, by default, to deny printing of the files 221 which are isolated in the sandbox 200, as shown by denied path 204.

In more detail, the security module 210 of the operating system 102 is arranged to perform an access check when a print request for the first file 111 in the primary user account 110 is directed toward any of the connected printers 50. The print request may take the form of a command, operation or function call associated with file printing. The security module 210 is configured to compare an access token of the application which requests printing against a security descriptor, such as an access control list (ACL), associated with the relevant printer 50. In one example, the access control list is suitably a Discretionary Access Control List (DACL) which identifies SIDs of users and groups that are allowed, or denied, various types of access as appropriate for that printer 50. As noted above, the user-level security context of the primary user account 110 is based on the user as the security principal and the access token is set accordingly. Hence, if the security context of the primary user account 110 has appropriate privileges then printing of a file 111 is permitted by the operating system 102, as shown by permitted path 104. Conversely, if those privileges are not available then printing of the relevant file is denied by the operating system 102, as discussed below and as shown by the denied path 204.

A connection from the primary user account 110 to one or more of the printers 50L, 50N may be established by the computer device 100. Corresponding printer user preference settings may be associated with the primary user account 110 on the computer device 100. In a Windows type environment, the operating system 102 may store these user preference settings in a registry associated with the primary user account 110. Additionally, the operating system 102 may hold further printer-related user settings such as in a Client Side Rendering Print Provider (CSRPP). In this way, the first file 111 may be printed to an appropriate destination printer.

By default, the file 221 in the sandbox 200 is associated with and limited by the secondary user account 210. In this example, the security context of the secondary user account 210 is deliberately constructed to have an insufficiently privileged level and thus the operating system 102 is configured to deny printing of the file 221. The second file 221 is therefore by default isolated from the local printer 50L and/or the network printer 50N, so as to mitigate a vulnerability or vector of attack. Consequently, the file 221 in the secondary user account 210 is incapable of being printed on either the local printer 50L or the network printer 50N.

Figure 3:
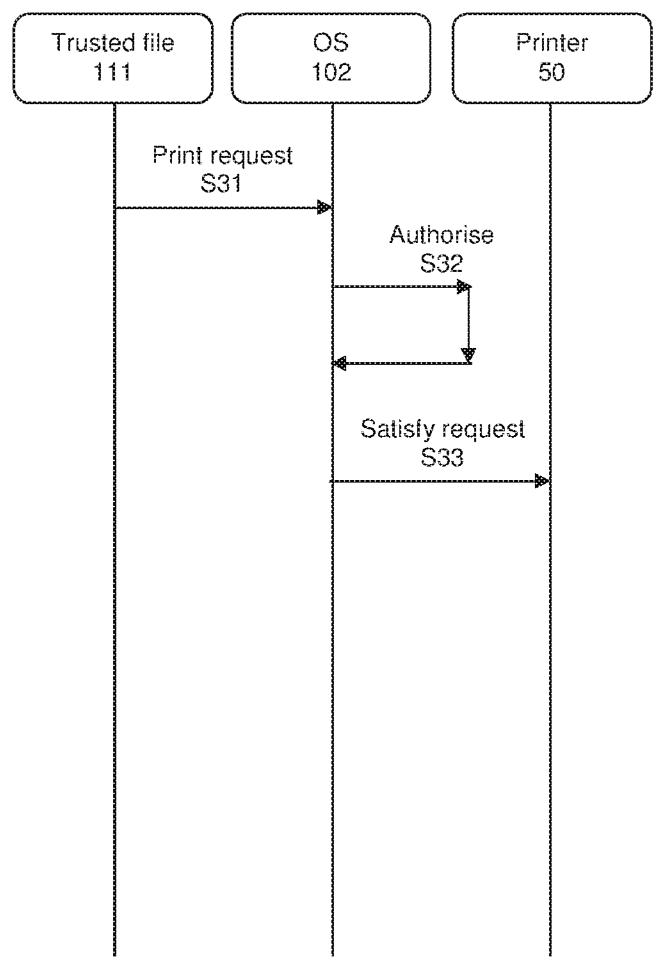
FIG. 3 is a flowchart of an example method of operating the computer device.

FIG. 3 is a schematic flow chart of a method of operating the computer device 100, including an example mechanism in which printing of the first file 111 on the printer 50 from the primary user account 110 is permitted by the operating system 102.

The user initiates printing of the first file 111 at step S31, for example by invoking the key binding ‘CTRL-P’ from the application running in the primary user account 110. In response, a new print dialog may be displayed and the user may select one of the printers 50. Assuming that the user selects in the print dialog to print the file 111, the print request for the file 111 is forwarded to the operating system 102, for example by calling the start print API function. At step S32, the operating system 102 permits or denies the print request S31, according to the security context of the primary user account 110. Assuming that the security context of the primary user account 110 is sufficiently privileged, the operating system 102 permits the print request S31, such that connection to the printer 50 is established and the first file 111 is printed on the printer 50 at step S33.

Figure 4:
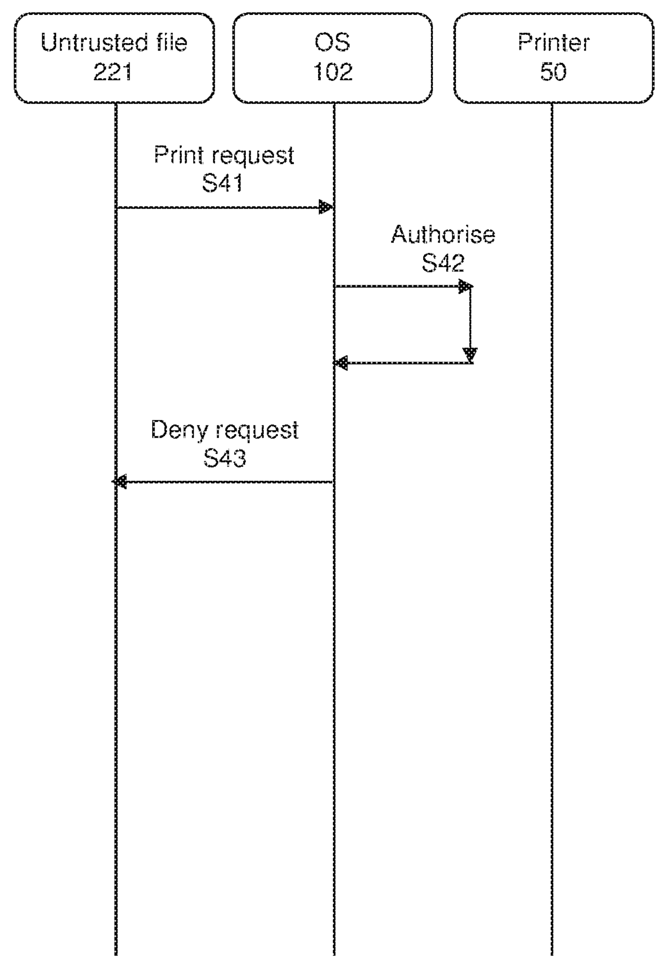
FIG. 4 is a flowchart of another example method.

FIG. 4 is a further schematic flowchart of the computer device 100 in operation. FIG. 4 shows an example operation in which printing of a second file 221 in the sandbox 200 is denied by the operating system 102, because this file 221 potentially contains malicious content.

As described previously, the user selects to print the file 221 from the application running in the sandbox 200 from the secondary user account 210 on the computer device 100. A new print dialog may be displayed, populated with printers which are available to the secondary user account 210. In some examples this print dialog may simply be empty and will not show any printers as being available, so that the method fails at this first stage. If the user is able to select a printer that has been provisioned for the secondary user account 210, the print request for the file 221 is forwarded to the operating system 102 at step S41. At step S42, the operating system 102 attempts to authorise the print request but, according to the insufficiently-privileged security context of the secondary user account 210, the request will be denied at step S43. Hence, a connection to the printer 50 is not established and the file 221 in the sandbox 200 cannot be directly printed to the printer.

Figure 5:
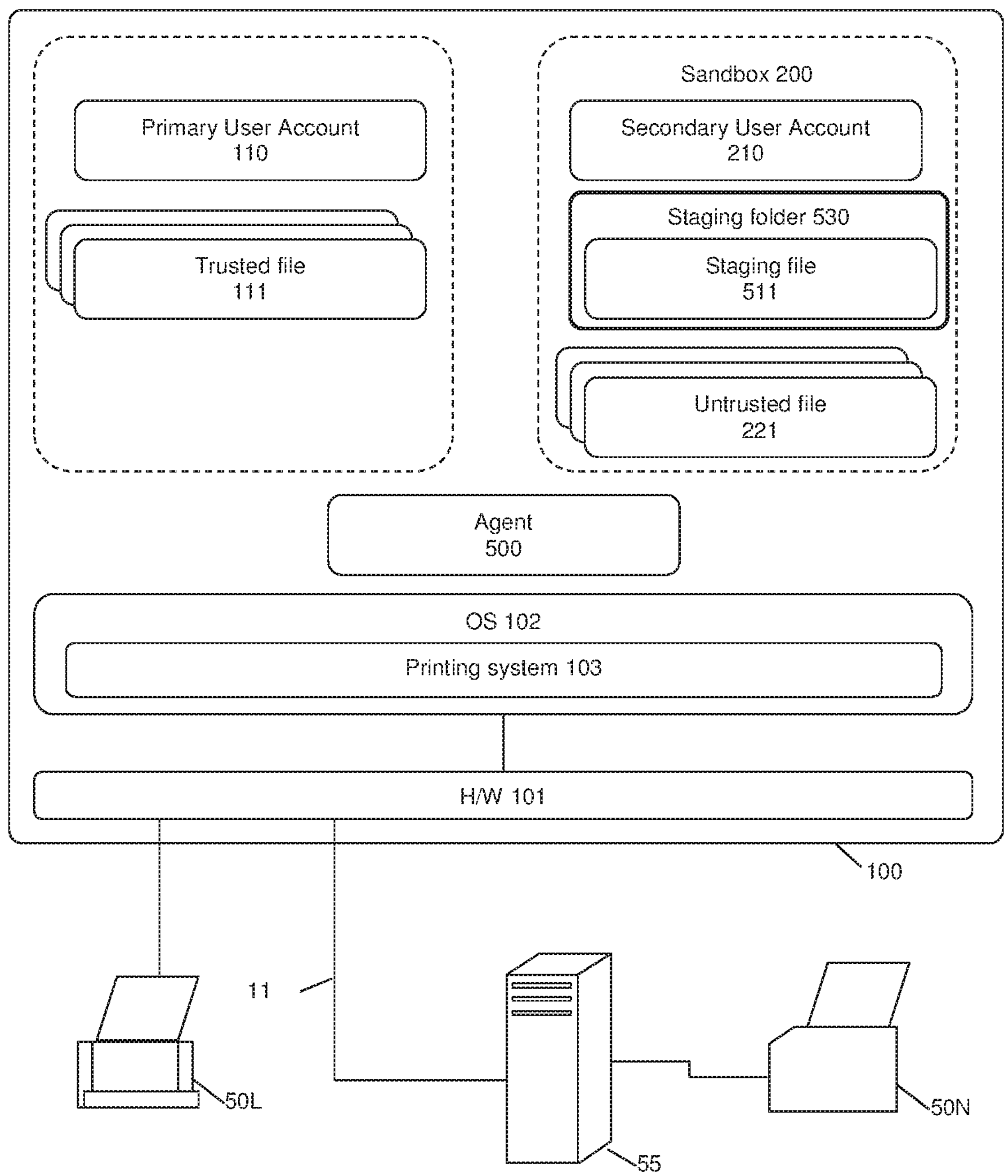
FIG. 5 is another schematic view of the example computer device.

FIG. 5 shows the computer device 100 when further adapted in order to permit printing of untrusted content isolated within the sandbox 200.

In this embodiment, the agent 500, which executes in cooperation with the operating system 102, is configured to arrange printing of the file 221. The agent 500 may selectively permit or deny printing requests, thereby selectively and securely controlling printing of the file 221 from the sandbox 200 but without compromising security of the computer device 100.

Generally, operation of the computer device 100 may be modified by intercepting relevant function calls, messages or events. For example, a functionality of the printing system 103 related to the file 221 may be modified by intercepting (or hooking) function calls of the printing system 103, or certain other messages or events.

In one example, the agent 500 is configured to intercept a print request sent from the sandbox 200 to the printing system 103 in a first stage of printing. For example, the agent 500 may be configured to intercept a print start request for the file 221. This print start request may be initiated in response to a command by the user (e.g. control-P) to print the file 221 from an isolated application running in the sandbox 200.

In response to the intercepted print request, the agent 500 is further configured to arrange the printing system 103 to print the untrusted file 221 to an intermediate staging file 511. Particularly, the staging file 511 is held in a staging location which is accessible from the primary user account 110. For example, the staging file 511 may be stored in a staging folder 530 in the sandbox 200. The staging folder 530 is accessible from the primary user account 110. Access rights of the staging folder 530 may correspond to the access rights of the primary user account 110. Access to the staging folder 530 may be controlled according to an ACL associated with the staging folder 530, for example, by the operating system 103, by the security module 210 and/or by the agent 500. This staging folder ACL may be a DACL, which identifies SIDs of users and groups that are allowed, or denied, various types of access as appropriate for the staging folder 530. For example, read-only access to the staging folder 530 and files therein such as the staging file 511 may be granted with respect to the primary user account 110 while write access may be additionally granted with respect to the secondary user account 210. Suitably, the location of the staging folder 530 is known to the agent 500, e.g. by being a predetermined folder within a hierarchical file structure on the computer device 100.

The agent 500 is further configured to receive a notification that printing of the original untrusted file 221 to the staging file 511 has completed. For example, the agent 500 may be configured to intercept a print end request for the file 221. The print end request may be sent by the isolated application running in the sandbox 200 to the printing system 103 to release resources associated with printing of the file 221.

Furthermore, in a second stage of printing, the agent 500 is configured to arrange for the staging file 511 to be printed on a printer 50 from the primary user account 110, in response to receiving the notification that printing of the original file 221 to the staging file 511 has completed. Since the security context of the primary user account 110 is of a sufficiently privileged level, the operating system 102 will permit printing of the trusted staging file 511 on the printer 50.

In this way, the agent 500 is configured to provide for printing of the file 221, isolated by the sandbox 200, on a printer 50 while still protecting the computer device 100 from the files 321. Thus, the computer device 100 remains protected from attack vectors related to the file 221 while advantageously, the user may print the isolated file 221 on any of the same set of printers 50 which are accessible to the user in the primary user account 110.

In further examples, the agent 500 may be configured to selectively intercept a print request for the file 221 sent from the sandbox 200 to the printing system 103. For example, the agent 500 may be configured to intercept a print request from a specific application and/or related to a specific file type. Conversely, the agent 500 may be configured to not intercept (i.e. ignore or pass through) a print request from another specific application and/or related to another specific file type.

Further, the agent 500 may be configured to define a file type of the staging file 511. For example, the file type may comprise XPS and/or Portable Document Format (PDF). In this way, the agent 500 may restrict a content of the staging file 511, e.g. by precluding files that may contain active and/or malicious content.

In one example, the agent 500 may be configured to limit printer options in the print dialog launched for the file 221 to these restricted file types. For example, the agent 500 may be configured to intercept a print dialog launch request originating from the sandbox 200 and set the printer options in the print dialog to one or more of the restricted file types and/or remove other printer options in the print dialog. In this way, the agent 500 may limit the staging file 511 to one of the restricted file types and thus the staging file 511 may be printed to the printer 50 without compromising security of the computer device 100. Alternatively, the agent 500 may be configured to not display the first file types in the print dialog. Rather, the agent 500 may be configured to determine the printers 50 accessible from the primary user account 110 and set the printer options in the print dialog to one or more of the printers 50. Further, the agent 500 may be configured to arrange printing of the file 221 to the staging file 511 if the user selects one of the printers 50 in the print dialog launched for the file 221 from the secondary user account 210.

The staging folder 530 may be a folder in the secondary user account 210, accessible to the secondary user account 210 and to the primary user account 110. Alternatively, the staging folder 530 may be accessible to the primary user account 110 and isolated from the secondary user account 210, wherein the agent 500 may be further configured to move and/or copy the staging file 511 from an initial location in the secondary user account 210 to the staging folder 530. The staging folder 530 may be created during creation of the secondary user account 210 or subsequently to creation of the secondary user account 210. Alternatively, the staging folder 530 may be created in the secondary user account 210 by the agent 500, which may be configured to create the staging folder 530 e.g. upon creation of the secondary user account 210 or in response to the print request. Further, the staging folder 530 may be created for a purpose of temporarily storing the staging file 511. Hence, the agent 500 may be configured to delete the staging folder 530 and/or contents of the staging folder 530, for example, in response to printing staging file 511 to one of the printers 500 and/or upon destruction of the secondary user account 210. Alternatively and/or additionally, the staging folder 530 may be deleted by, for example, the operating system 102 upon destruction of the secondary user account 210.

The agent 500 may be additionally configured to provide an output location of the staging file 511. In this way, the agent 500 may define where the staging file 511 is stored. For example, the agent 500 may set a path of the staging file 511 to that of the staging folder 530 in the print dialog launched from the secondary user account 210 for the file 221. Further, the agent may enforce the output location, for example by controlling or preventing modification (e.g. user modification) of the output location print dialog launched for the file 221. In this way, the agent 500 may isolate the staging file 511 to a trusted location and thereby uphold security of the computer device 100. Further, the agent 500 may be configured to provide the filename of the staging file 511. For example, the agent 500 may assign a predetermined filename to the staging file 511 in the print dialog launched from the secondary user account 210 for the file 221. Further, the agent may enforce the filename of the staging file 511, for example by controlling or preventing modification (e.g. user modification) of the filename in the print dialog launched for the file 221.

In addition, the agent 500 may be configured to monitor the staging folder 530, so as to receive a notification that printing of the file 221 to the staging file 511 has completed. For example, the agent 500 may be configured to monitor for the staging file 511. The agent 500 may optionally be configured to determine that printing of the file 221 to the staging file 511 has completed according to, for example a file size of the staging file 511 i.e. a constant file size.

Furthermore, the agent 500 may be configured to launch the print dialog from the primary user account 110, so as to initiate printing of the staging file 511 on the printer 50. For example, the agent 500 may be configured to launch the print dialog from the primary user account 110 in response to the notification that printing of the file 221 to the staging file 511 has completed. In this way, the user may be prompted to print the staging file 511 on the printer 50. Additionally, the agent 500 may be configured to supply the path and/or the filename of the staging file 511. For example, the agent 500 may be configured to set the path and/or the filename of the staging file 511 in the print dialog launched from the primary user account 110 for the staging file 511. In this way, a convenience of the user is increased.

In addition, the agent 500 may be configured to delete the staging file 511. For example, the agent 500 may be configured to delete the staging file 511 in response to a notification that the staging file 511 has been printed on the printer 50. In this way, printing of the file 221 from the secondary user account 210 may be more transparent to the user, while minimizing storage requirements associated with the secondary user account 210.

Optionally, the agent 500 may be configured to intercept the print dialog request from the secondary user account 210 in relation to the file 221, deny this print dialog request, programmatically print the file 221 to the staging file 511 and subsequently launch the print dialog from the primary user account 110 for the staging file 511, according to the mechanism described previously, in place of the denied print dialog. In this way, the user may directly print the staging file 511, without intermediary steps.

The agent 500 thus controls printing of isolated, untrusted content and may be configured as software which executes using the underlying hardware 101. For example, the agent 500 may be implemented on and/or for the computer device 100 as, a server or a daemon. In the illustrated example, the agent 500 is shown installed on the computer device 100, and suitably operates in close association with the operating system 102. In one example, the agent 500 may operate alongside the operating system 102 and is installed on the computer device 100 in addition to the commodity operating system 102. In another example, the functions of the agent 500 may be integrated within the operating system 102, e.g. by releasing an adapted or modified form of the operating system 102.

Figure 6:
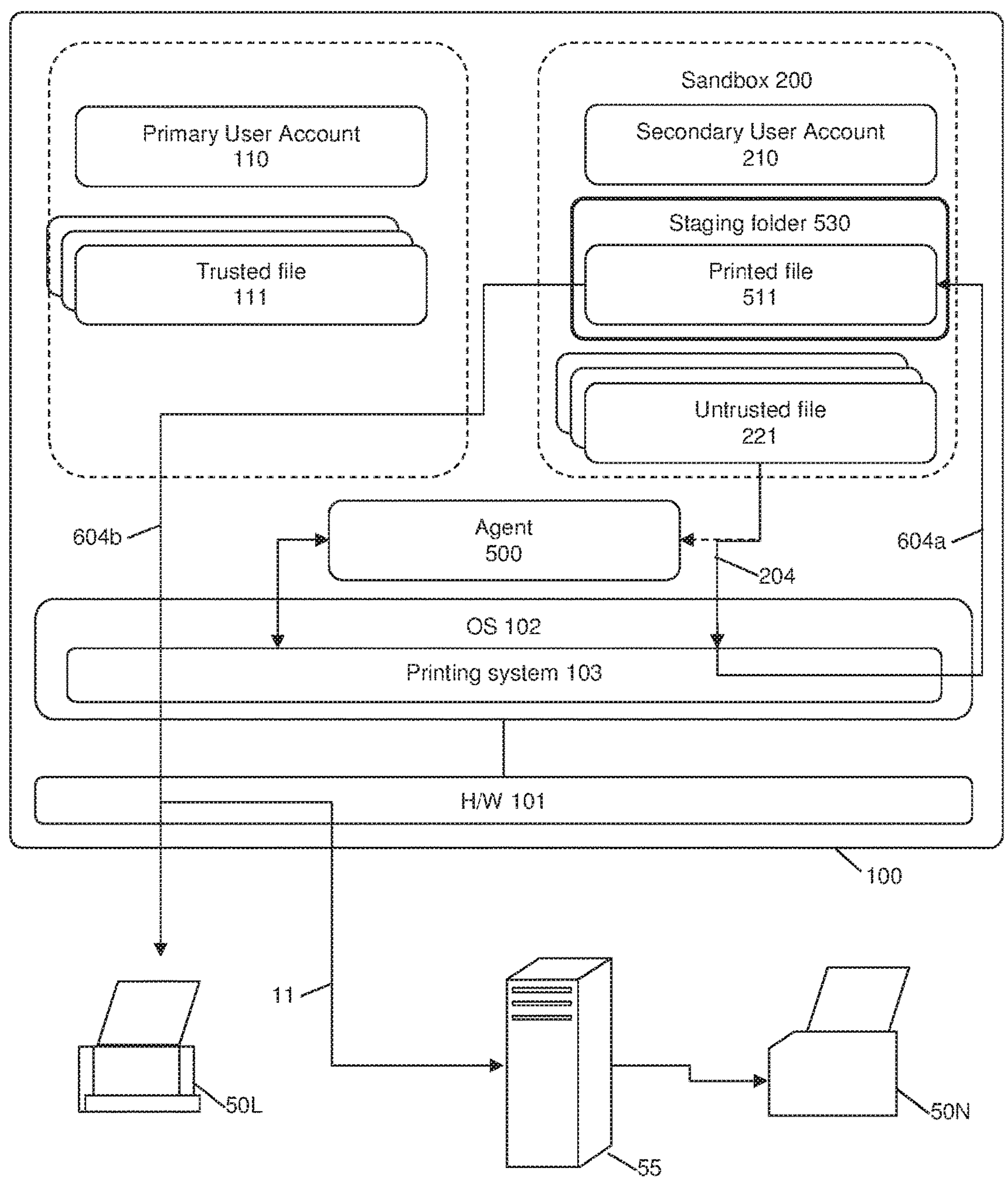
FIG. 6 is a schematic view of the example computer device when in operation.

FIG. 6 is a further schematic view of the computer device 100 in operation. In contrast to the behaviour described previously, FIG. 6 shows an example mechanism in which printing of the file 221 in the sandbox 200 on the printer 50 from the secondary user account 210 is enabled by the agent 500.

As described previously, the computer device 100 by default, denies printing of files 221, which are isolated in the sandbox 200.

In one example embodiment, the agent 500 intercepts the print request 204 for the file 221 sent from the sandbox 200 to the printing system 103 in the first stage of printing.

In response to the intercepted print request, the agent 500 arranges the printing system 103 to print the content file 221 to the staging file 511, according to path 604*a*. Subsequently, the agent 500 receives a notification that printing of the file 221 to the staging file 511 has completed, for example by intercepting a print end request. In the second stage of printing, the agent 500 arranges for the staging file 511 to be printed on a printer 50 from the primary user account 110, according to path 604*b*.

Figure 7:
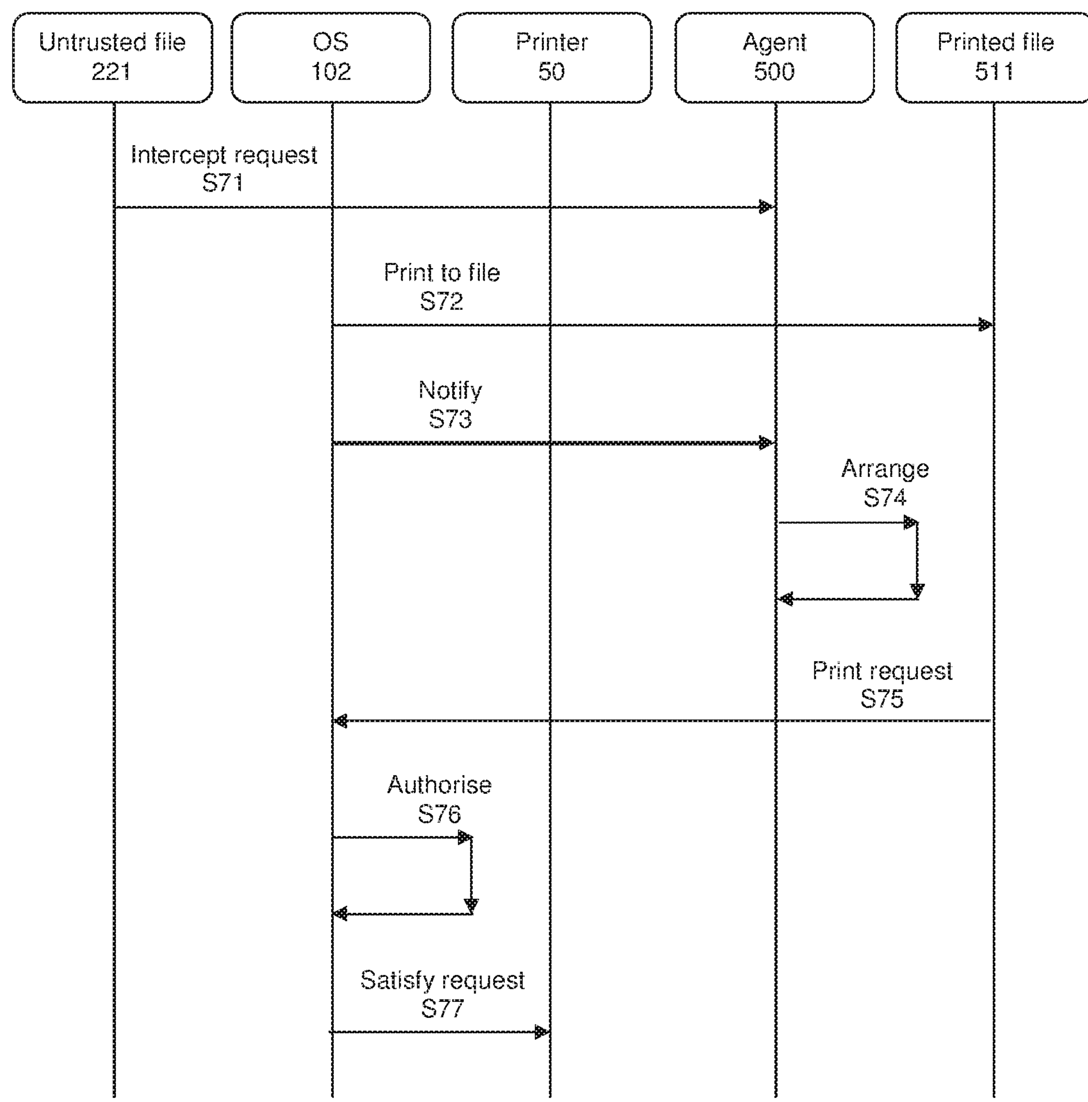
FIG. 7 is a flowchart of an example method of operating a computer device.

FIG. 7 is a further schematic view of the computer device 100 in more detail. FIG. 7 shows an example mechanism in which printing of the file 221 in the sandbox 200 on the printer 50 from the secondary user account 210 is enabled by the agent 500.

As described previously, the user selects to print the file 221 from the isolated application running in the sandbox 200 from the secondary user account 210 on the computer device 100. A new print dialog may be displayed. However, in contrast to default printing from the secondary user account 210, the user may be able to only select to print to a first file type. Assuming that the user selects in the print dialog to print the file 221 to a file of a user-selected or a predetermined filename, the print request at step S71 for the file 221 is forwarded to the operating system 102, for example by calling the start print API function, and is intercepted by the agent 500. The agent 500 may obtain the filename of the file to be printed from the intercepted print request at S71 and the agent 500 may store the filename. At S72, the operating system 102 may permit or deny the print request, according to the security context of the secondary user account 210. Assuming that the security context of the secondary user account 210 is sufficiently privileged for file-based printing according to the minimal set of access rights as the default, original privilege level, the operating system 102 permits the print request, such that the file 221 is printed to the staging file 511 in the staging folder 300.

At S73, the agent 500 receives a notification that the file 221 has been printed to the staging file 511. In response, the agent 500 arranges at step S74 printing of the staging file 511 on the printer 50 from the primary user account 110. Now, a print request for the staging file 511 is directed towards the printer 50 at step S75. At step S76, the operating system 102 permits or denies this second print request for the staging file 511 on the printer 50. If the operating system 102 permits the print request, connection to the printer 50 is established and the staging file 511 is printed on the printer 50 at step S77.

Figure 8:
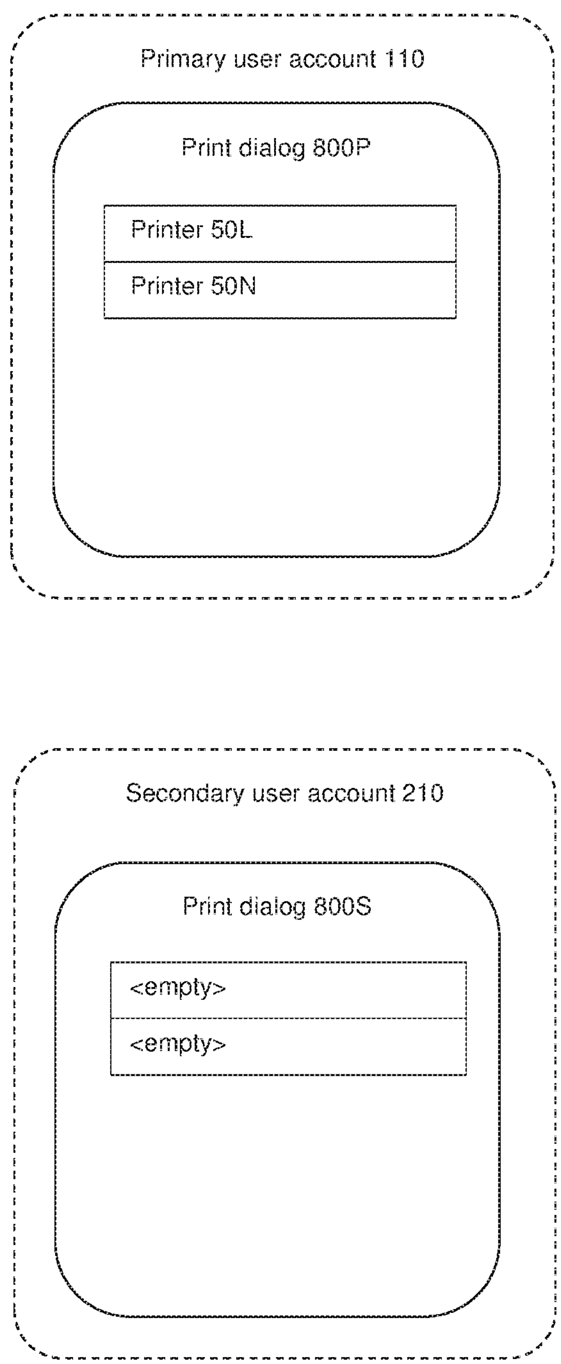
FIG. 8 is a schematic view of the example computer device in more detail.

FIG. 8 is a further schematic view of the computer device in more detail. Typically, printer options selectable by users in print dialogs are determined according to access rights of the user. A print dialog 800P launched from the primary user account 110 e.g. for the first file 111 may display by default the set of one or more printers which are accessible by the computer device 100, according to the security context of the primary user account 110. Hence, for example, the printers 50L and 50N may ordinarily be selectable by the user in the print dialog 800P.

FIG. 8 for illustration also shows another print dialog 800S, which is launched from the secondary user account 210. Hence, when the user commands to print the file 111, this print dialog may display zero available printers, according to the security context of the secondary user account 210. Particularly, since the security context of the secondary user account 210 is deliberately restricted to the minimal set of access rights as its default, original privilege level, as described previously, neither the printer 50L nor the printer 50N may be selectable by the user in the print dialog 800S.

Figure 9:
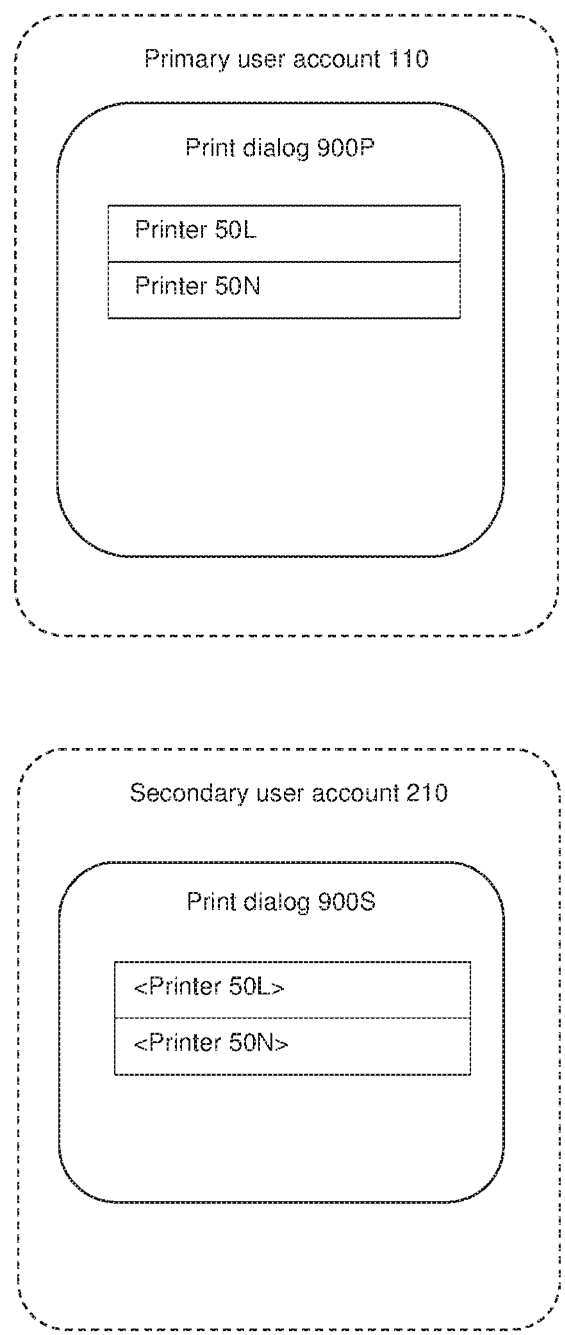
FIG. 9 is a schematic view of the example computer device in more detail.

FIG. 9 is a further schematic view of the computer device in more detail, in which the agent 500 is configured to adapt the default behaviour of the computer device 100. Particularly, the agent 500 is configured to populate the print dialogs launched from the secondary user account 210 with one or more of the set of printers which are ordinarily available to the user from the primary user account 110.

In FIG. 9, the print dialog 900P launched from the primary user account 110 may display by default the printers 50L and 50N, as described previously. In this example, an adapted print dialog 900S launched from the secondary user account 210 also appears to display the same set of printers. For example, the agent 500 may be configured to populate the printer options in the print dialog 900S so as to include the printer 50L and the printer 50N, as selectable by default by the user in the print dialog 900P launched from the primary user account 110. Specifically, the agent 500 may be configured to intercept a print dialog request from the secondary user account 210, determine the set of printers 50 which are accessible from the primary user account 110, and set the printer options for the intercepted print dialog request to include the determined printers 50. For example, the agent 500 may determine the printers 50 by impersonating the primary user account 110 when calling a printer spooler API function i.e. calling the printer spooler API function according to the security context of the primary user account 110, rather than according to the security context of the secondary user account 210.

However, since by default the files 221 in the secondary user account 210 may not be printed on these printers 50, according to the security context of the secondary user account 210, the agent 500 may be further configured to intercept print requests from the secondary user account 210 directed towards the printers 50 and redirect these print requests so as to print according to the mechanism described previously, i.e. by first printing to the staging file 511 in the staging folder 530 and then subsequently printing from the staging file 511 to the indicated printer 50. The redirection of the agent 500 via the staging file 511 thus may appear transparent to the user, with little or no noticeable change in behaviour as far as the user interface is concerned, even though a different print mechanism is happening 'under the hood'.

In this way, the user may print files from the secondary user account 210 in a similar manner to printing from the primary user account 110. That is, those printers 50 selectable by the user from the primary user account 110 may also be selectable by the user from the secondary user account 210 though printing to the printers 50 from the secondary user account 210 may be in accordance with the mechanism described previously.

Figure 10:
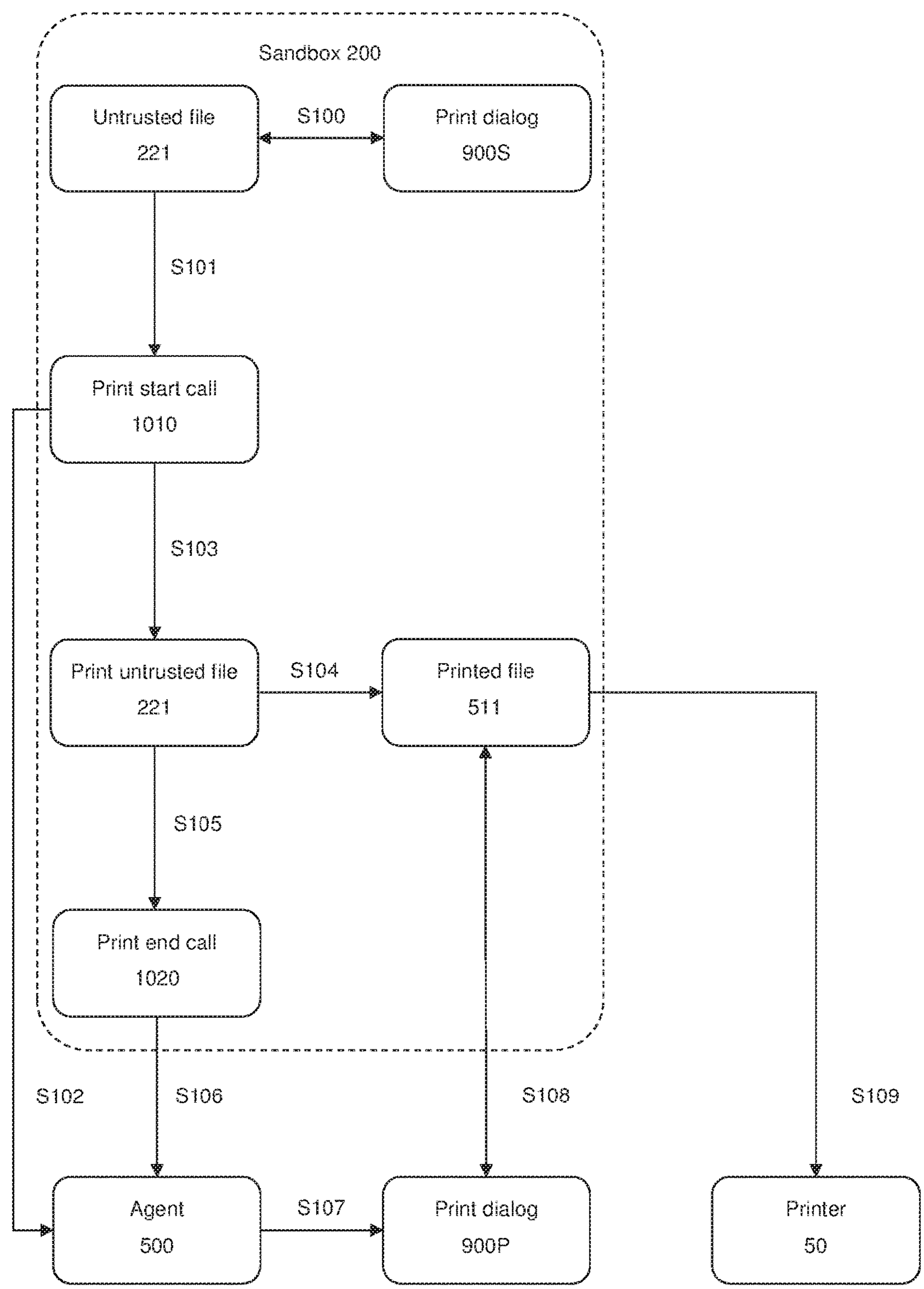
FIG. 10 is a flowchart of another example method of operating the computer device.

FIG. 10 is a further schematic view of the computer device 100 in operation, by way of illustration. As detailed previously, the computer device 100 is adapted in order to permit printing of untrusted content from the sandbox 200 to a printer 50 which is isolated by default from the sandbox 200.

From the isolated application running in the sandbox 200 under the secondary user account 210, the user chooses a print menu command for the file 221. In response, the print dialog 900S is launched at step S100, for example by the isolated application creating a CPrintDialog object. As described previously, the agent 500 may intercept creation and/or display of the print dialog 900S so as to allow the user to select from the print dialog 900S one of the printers 50 accessible to the user from the primary user account 110. Particularly, the agent 500 may determine the printers 50 to be displayed in the print dialog 900S by impersonating the primary user account 110 when calling a Printer Spooler API function EnumPrinters, i.e. calling EnumPrinters according to the security context of the primary user account 110, rather than according to the security context of the secondary user account 210. Furthermore, an output location for printing may be restricted by the agent 500 to a predetermined location, for example, the staging folder 530. As with the availability of the printers 500, the output location may be configured by the agent 500 as previously described.

The users selects an 'OK' button in the print dialog 900S and, in turn, the isolated application starts the print job. Particularly, the isolated application calls a GDI Print Spooler API OpenPrinter function to retrieve a handle to a printer object for the print job. This handle request may take the form:

```
BOOL OpenPrinter(
   _In_ LPTSTR pPrinterName,
   _Out_ LPHANDLE phPrinter,
   _In_ LPPRINTER_DEFAULTS pDefault
);
```

where pPrinterName specifies the name of the selected printer 50, phPrinter receives the handle to the selected printer 50 and pDefault is a pointer to a PRINTER_DEFAULTS structure. The agent 500 may intercept the OpenPrinter function so as to redirect printing from the selected printer 50 to an XPS printer, e.g. by returning the handle phPrinter for the XPS printer. Specifically, the XPS printer may be a secure XPS printer, derived from a Microsoft XPS Printer Writer. The agent 500 may cache the name pPrinterName of the selected printer 50 so as to subsequently pre-select the user-selected printer 50 in another print dialog.

The isolated application calls the GDI Print API StartDoc function at step S101 to start the print request, using a handle to a device context, which may be created by calling CreateDC and passing the name pPrinterName of the selected printer 50, as passed to OpenPrinter. This print start request may take the form:

```
int StartDoc(
   _In_ HDC hdc,
   _In_ const DOCINFO *lpdi
);
```

where hdc is the handle to the device context for the print job (i.e. the XPS printer) and Ipdi is a pointer to a DOCINFO structure that includes file names used by the StartDoc function.

In this example, the DOCINFO structure comprises input and output file names used by the StartDoc function:

```
typedef struct{
  int            cbSize;,
  LPCTSTR        lpszDocName;
  LPCTSTR        lpszOutput;
  LPCTSTR        lpszDatatype;
  DWORD          fwType;
} DOCINFO, *LPDOCINFO
```

where cbSize is the size, in bytes, of the structure; IpszDocName is a pointer to a null-terminated string that specifies a name of the document; IpszOutput is a pointer to a null-terminated string that specifies a name of an output file or is NULL; IpszDatatype is a pointer to a null-terminated string that specifies a type of data used to record the print job or is NULL; and fwType specifies additional information about the print job.

At step S102, the agent 500 intercepts the StartDoc function call originating from the sandbox 200 and may store the handle hdc and/or the DOCINFO structure parameters.

The agent 500 may cache the name of the output file IpszOutput. In this way, the agent 500 may subsequently retrieve the name of the output file and/or, for example, arrange for the output file to be retrieved. In addition, the agent 500 may set the name of the output file IpszOutput. In this way, the agent 500 may define where the output filed is stored. For example, the agent 500 may set a path of the output file IpszOutput to that of the staging folder 530. Further, the agent 500 may set a predetermined name of the output file IpszOutput to that of the staging file 511.

At step S103, printing of the original file 221 is handled by the operating system 102, such that the original file 221 may be printed by the XPS printer to the staging file 511 in the staging folder 530 in the sandbox 200 according to step S104. Printing of the file 221 is ended by the isolated application calling the GDI Print API function EndDoc 820 at step S105. This print end request may take the form:

```
int EndDoc(
  _In_ HDC hdc,
);
```

where hdc is a handle to the device context for the print job.

The agent 500 intercepts the EndDoc function call originating from the sandbox 200 at step S106. In this way, the agent 500 is notified that printing of the staging file 511 has been completed, i.e. that the staging file 511 has been written by the computer device 100 to the staging folder 530. In this way, the agent 500 is directed to the staging folder 530 only when the expected staging file 511 will be present. The staging folder 530 may be ignored at all other times. In one example, the agent 500 is concerned only with the staging file 511 which has a specific name according to the output file name in IpszOutput. At this stage, the agent 500 may delete (expunge) all other files in the staging folder 530, thereby maintaining integrity of the computer device 100.

In response to the notification of availability of the staging file 511, the agent 500 launches the print dialog 900P from the primary user account 110 for the staging file 511 at step S107. Particularly, the agent 500 runs a proxy process in a context of the primary user account 110 so as to print the staging file 511. This proxy process run by the agent 500 thus launches the print dialog 900P from the primary user account 110 for the staging file 511 at step S107. As with the print dialog 900S launched from the secondary user account 210, the user may select any of the printers 50 available under the primary user account 110, according to the security context of the primary user account 110, as described previously. Also as described previously, the agent 500 may have set the staging file 511 to be printed in the print dialog 900P, at step S108, according to the cached output file name IpszOutput. Further, the agent 500 may have pre-selected the printer 50 in the print dialog 900P, as previously selected by the user in the print dialog 900S, according to the cached handle hdc.

At step S109, in response to the user selecting 'OK' in the print dialog 900P, the staging file 511 is printed to the printer 50 by the operating system 102. The agent 500 may subsequently delete the staging file 511, for example, upon calling or intercepting the EndDoc function call associated with printing of the staging file 511.

In addition to intercepting the GDI Print API function calls StartDoc and EndDoc, the agent 500 may be configured to intercept other or all GDI Print API function calls. For example, in response to intercepting a GDI Print API AbortDoc function call in an event that the user cancels printing, the agent 500 may abort the described printing mechanism. Additionally, the agent 500 may be configured to intercept function calls related to the print dialogs 900S, 900P so as to, for example, set available printers and/or filenames and/or locations, as described previously.

Rather than intercepting the OpenPrinter function as described above, the agent 500 may instead redirect printing to the XPS printer by replacing the handle hdc with another handle for the XPS printer. The agent 500 may then cache the handle hdc so as to subsequently pre-select the user-selected printer 50 in another print dialog. In addition, the agent 500 may hide the XPS printer from the primary user account 110 and/or the secondary user account, for example, by intercepting calls to the Print Spooler API Functions EnumPrinters and/or FindNextPrinterChangeNotification and filtering out the XPS printer.

Interestingly, the computer device 100 of the example embodiments still provides a satisfactory user experience in terms of printing. Particularly, this controlled access to printing prevents the possibility of accidental tampering with the computer device 100 and maintains security and isolation of potentially malicious code by being able to deny or restrict potentially insecure printing operations. At the same time, untrusted content isolated in sandboxes may be printed on user-available printers by initially printing the untrusted content to trusted content in trusted locations and subsequently, printing that newly-printed trusted content on the user-available printers.

This described mechanism for printing sandboxed, untrusted content works within the security context of the secondary user account and respects the security context of the primary user account. In summary, the example embodiments have described an improved mechanism for controlling access to a printer on a computer device. The industrial application of the example embodiments will be clear from the discussion herein.

In summary, content files are isolated in a sandbox as a content isolation environment formed by a secondary user account. Printing is controlled by an agent via a staging file of a secure file type. The agent intercepts print requests (e.g. print start requests and print end requests) in a printing sub-system of an operating system in order to coordinate and securely control printing of the untrusted content file via the intermediate staging file.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A computer device coupled to a printer, the computer device comprising:

a hardware layer including a processor and a memory;

an operating system and an agent which are executed by the hardware layer to:

provide printer services accessible from a primary user account, wherein the printer services are configured to print user files accessible from the primary user account on the printer connected to the computer device in response to print requests for the user files;

create a secondary user account derived from the primary user account and which isolates a content file therein; and provision a printer service accessible from the secondary user account, wherein the printer service is isolated from the printer connected to the computer device; and intercept a print request from the secondary user account for printing of the content file;

arrange the printer service to print the content file to a staging file in a staging location in response to the print request;

receive a notification that the content file has been printed to the staging file; and satisfy the print request for the file from the secondary user account by printing the staging file on the printer connected to the computer device using the printer services accessible from the primary user account, in response to the notification that the file has been printed to the staging file.

2. The computer device according to claim 1, wherein the agent is further configured to examine the intercepted print request and determine an outcome selected from a group comprising (i) passing through the print request to the operating system, (ii) denying the print request, or (iii) continuing the print request via the staging file.

3. The computer device according to claim 1, wherein the staging file is stored in the staging location which is accessible from the primary user account and wherein the agent is configured to obtain the staging location of the staging file from the intercepted print request.

4. The computer device according to claim 1, wherein the agent is configured to store a filename of the staging file.

5. The computer device according to claim 1, wherein the agent is configured to set a file type of the staging file.

6. The computer device according to claim 1, wherein the agent is configured to set the staging location of the staging file.

7. The computer device according to claim 1, wherein the staging location of the staging file is a folder in the secondary user account which is also accessible from the primary user account.

8. The computer device according to claim 1, wherein the agent is configured to arrange printing of the staging file on the printer connected to the computer device by launching a print dialog from the primary user account in response to the notification that the content file has been printed to the staging file.

9. The computer device according to claim 1, wherein agent is configured to receive the notification that the content file has been printed to the staging file by intercepting an end print request related to the content file.

10. The computer device according to claim 1, wherein the agent is configured to delete the staging file after the print request has been satisfied.

11. A method for controlling printing of files on a computer device, the method being implemented by hardware of the computer device including at least a processor and a memory, the method comprising:

providing printer services accessible from a primary user account, wherein the printer services are configured to print user files accessible from the primary user account on a printer connected to the computer device in response to print requests;

creating a secondary user account derived from the primary user account and which isolates a content file therein; and provisioning a printer service accessible from the secondary user account, wherein the printer service is isolated from the printer connected to the computer device;

intercepting a print request from the secondary user account to print the content file;

arranging the printer service to print the content file to a staging file in response to the print request;

storing the staging file in a staging location accessible from the primary user account;

receiving a notification that the content file has been printed to the staging file; and satisfying the print request for the content file by arranging the staging file to be printed on the printer connected to the computer device using the printer services accessible from the primary user account, in response to the notification that the file has been printed to the staging file.

12. The method according to claim 11, wherein the method further comprises examining the intercepted print request and determining an outcome selected from a group comprising (i) passing through the print request to the operating system, (ii) denying the print request, or (iii) continuing the print request via the staging file.

13. The method according to claim 11, wherein the staging file is stored in the staging location which is accessible from the primary user account and wherein the method comprises obtaining the staging location of the staging file from the intercepted print request.

14. The method according to claim 11, wherein the method comprises storing a filename of the staging file.

15. The method according to claim 11, wherein the method comprises setting a file type of the staging file.

16. The method according to claim 11, wherein the method comprises setting the staging location of the staging file.

17. The method according to claim 11, wherein the staging location of the staging file is a folder in the secondary user account which is also accessible from the primary user account.

18. The method according to claim 11, wherein arranging printing of the staging file on the printer connected to the computer device comprises launching a print dialog from the primary user account in response to the notification that the content file has been printed to the staging file.

19. The method according to claim 11, wherein receiving the notification that the content file has been printed to the staging file comprises intercepting an end print request related to the content file.

20. A non-transitory computer readable storage medium having recorded thereon instructions which, when implemented by hardware of a computer device including at least a processor and a memory, cause the computer device to perform operations comprising:

providing printer services accessible from a primary user account, wherein the printer services are configured to print user files accessible from the primary user account on a printer connected to the computer device in response to print requests;

creating a secondary user account derived from the primary user account and which isolates a content file therein; and provisioning a printer service accessible from the secondary user account, wherein the printer service is isolated from the printer connected to the computer device;

intercepting a print request from the secondary user account to print the content file;

arranging the printer service to print the content file to a staging file in response to the print request;

storing the staging file in a staging location accessible from the primary user account;

receiving a notification that the content file has been printed to the staging file; and satisfying the print request for the content file by arranging the staging file to be printed on the printer connected to the computer device using the printer services accessible from the primary user account, in response to the notification that the file has been printed to the staging file.

* * * * *